United States Patent
Bajekal et al.

(10) Patent No.: US 9,520,919 B2
(45) Date of Patent: Dec. 13, 2016

(54) MAGNETIC WIRELESS GROUND DATA LINK FOR AIRCRAFT HEALTH MONITORING

(71) Applicant: Simmonds Precision Products, Inc., Vergennes, VT (US)

(72) Inventors: Sanjay Bajekal, Simsbury, CT (US); Michael Anthony Lynch, Shelburne, VT (US)

(73) Assignee: SIMMONDS PRECISION PRODUCTS, INC., Vergennes, VT (US)

( * ) Notice: Subject to any disclaimer, the term of this patent is extended or adjusted under 35 U.S.C. 154(b) by 109 days.

(21) Appl. No.: 14/168,412

(22) Filed: Jan. 30, 2014

(65) Prior Publication Data

US 2015/0215004 A1  Jul. 30, 2015

(51) Int. Cl.
| | |
|---|---|
| H04B 5/00 | (2006.01) |
| H01Q 7/00 | (2006.01) |
| H01Q 1/28 | (2006.01) |
| H04L 29/08 | (2006.01) |
| H04B 7/185 | (2006.01) |

(52) U.S. Cl.
CPC .............. *H04B 5/0031* (2013.01); *H01Q 1/28* (2013.01); *H01Q 7/00* (2013.01); *H04B 5/0081* (2013.01); *H04B 7/18506* (2013.01); *H04L 67/12* (2013.01)

(58) Field of Classification Search
CPC .................................................... H04B 5/0031
USPC ...................................... 455/41.1, 41.2, 431
See application file for complete search history.

(56) References Cited

U.S. PATENT DOCUMENTS

| | | | |
|---|---|---|---|
| 6,047,165 | A | 4/2000 | Wright et al. |
| 6,163,681 | A | 12/2000 | Wright et al. |
| 6,181,990 | B1 | 1/2001 | Grabowsky et al. |
| 6,816,728 | B2 | 11/2004 | Igloi et al. |
| 9,126,514 | B2 * | 9/2015 | Soar |
| 2003/0130769 | A1 | 7/2003 | Farley et al. |
| 2009/0070841 | A1 * | 3/2009 | Buga et al. ................... 725/116 |
| 2013/0005251 | A1 | 1/2013 | Soar |

FOREIGN PATENT DOCUMENTS

WO    2011044695 A1    4/2011

OTHER PUBLICATIONS

The extended European search report; Dated: Jul. 17, 2015; Application No. EP14200419; pp. 1-6.

* cited by examiner

*Primary Examiner* — Tuan H Nguyen
(74) *Attorney, Agent, or Firm* — Cantor Colburn LLP

(57) ABSTRACT

A system and method of communicating a signal is disclosed. An aircraft is moved so that an aircraft-based coil is within a selected volume defined by a ground-based coil. A current is modulated in one of the aircraft-based coil and the ground-based coil to generate a magnetic field in the volume. A current generated in the other of the aircraft-based coil and the ground-based coil in response to the generated magnetic field is measured to communicate the signal.

14 Claims, 4 Drawing Sheets

MAGNETIC WIRELESS GROUND DATA LINK FOR AIRCRAFT HEALTH MONITORING

BACKGROUND

The present disclosure relates to aircraft communications and, more specifically, to systems and methods of wireless communications between an aircraft on the ground and a ground-based location.

Aircraft are routinely equipped with sensors to establish estimates of wear and tear, load conditions, etc., so that maintenance may be carried out in a proactive manner. This data is downloaded to ground-based computers for further analysis and processing after the aircraft has landed. Current technologies for downloading aircraft data may include wireless communication in frequency bands around 2.4 Gigahertz (GHz) and commercial communication frequencies such as Groupe Special Mobile (GSM) or Code Division Multiple Access (CDMA) standards. However, these frequency bands are also used by devices that are increasingly being used by airline passengers, such as mobile laptop computers, tablet computers, smartphones, etc. Thus aircraft data communication competes for bandwidth with these passenger devices. Additionally, the combination of decreasing cost of sensors and increasing capability in computing is leading to orders of magnitude increase in the amount of acquired data per flight on each aircraft, thus requiring more bandwidth.

SUMMARY

According to one embodiment of the present disclosure, a method of communicating a signal includes: moving an aircraft so that a aircraft-based coil is within a selected volume defined by a ground-based coil; modulating a current in one of the aircraft-based coil and the ground-based coil to generate a magnetic field in the volume; and communicating the signal by measuring a current generated in the other of the aircraft-based coil and the ground-based coil in response to the generated magnetic field.

According to another embodiment of the present disclosure, a communication system includes: a ground-based coil; a ground-based transceiver configured to generate and measure a magnetic field at the ground-based coil to communicate a signal; an aircraft movable with respect to the ground-based coil; an aircraft-based coil conveyed on an aircraft; and a transceiver conveyed on the aircraft configured to generate and measure a magnetic field at the aircraft-based coil to communicate the signal.

Additional features and advantages are realized through the techniques of the present disclosure. Other embodiments and aspects of the disclosure are described in detail herein and are considered a part of the claimed disclosure. For a better understanding of the disclosure with the advantages and the features, refer to the description and to the drawings.

BRIEF DESCRIPTION OF THE SEVERAL VIEWS OF THE DRAWINGS

The subject matter which is regarded as the disclosure is particularly pointed out and distinctly claimed in the claims at the conclusion of the specification. The forgoing and other features, and advantages of the disclosure are apparent from the following detailed description taken in conjunction with the accompanying drawings in which:

DETAILED DESCRIPTION

Figure 1:
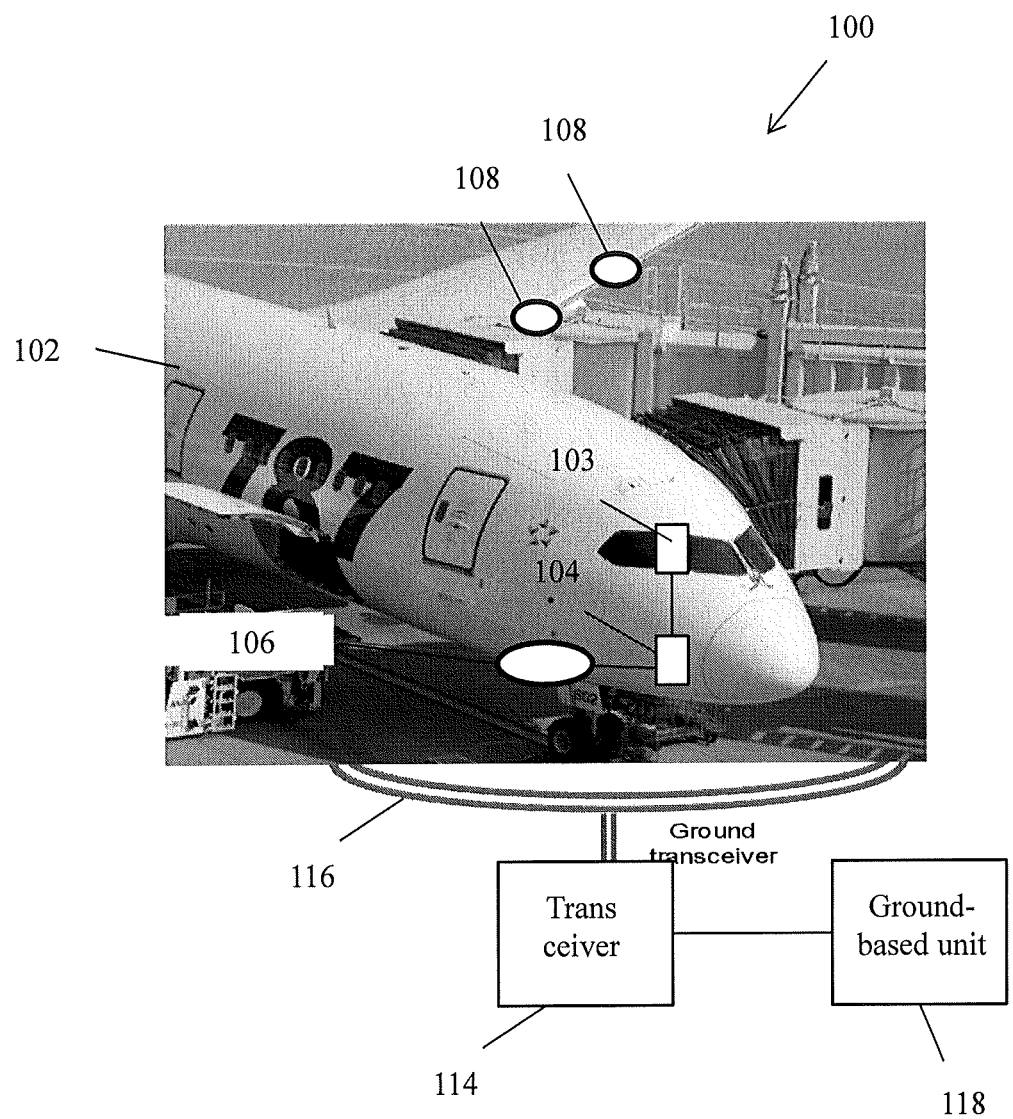
FIG. 1 shows an exemplary communication system between an aircraft at a ground location and a ground-based unit.

FIG. 1 shows an example of a communication system 100 allowing communication between an aircraft 100 at a ground location and a ground-based unit 118. The aircraft 102 that may be any form of aircraft, such as a passenger aircraft, commuter aircraft, helicopter, etc. As illustrated, a transceiver 104 that is coupled to an aircraft-based coil 106, with both transceiver 104 and aircraft-based coil 106 being located on aircraft 102. The aircraft-based coil 106 may be a magnetic loop antenna, in one embodiment. The transceiver 104 may be coupled to one or more sensors 108 located in the aircraft. The sensors 108 may be located at various locations in the aircraft and may be configured to obtain data relating to health of the aircraft, force on the aircraft in flight, or other data that may be of interest to ground crew, airplane designers, etc. The obtained data may be sent from the sensors 108 to the transceiver 104 or to a memory storage device 103 on the aircraft 102. In one mode of operation (a transmitting mode), the transceiver 104 may produce or modulate a current in the aircraft-based coil 106 to generate a magnetic field. The modulation of the coil may be selected to encode a signal in the generated magnetic field. The encoded signal may be related to the data obtained at the sensors 108. In another mode of operation (a receiving mode), the transceiver 104 may measure or monitor a current generated in the coil 106 in response to a modulating magnetic field.

The system 100 further includes a ground-based transceiver 114 coupled to a ground-based coil 116, which may be a magnetic loop antenna in one embodiment. Similar to the transceiver of the aircraft 102, in a transmitting mode of operation, the transceiver 114 may produce or modulate a current in the ground-based coil 116 to generate a magnetic field. In a receiving mode of operation, the ground-based transceiver 114 may measure or monitor a current generated in the aircraft-based coil 106 in response to a modulating magnetic field. By operating the transceiver 104 in a transmitting mode and the ground-based transceiver 114 in a receiving mode, data may be transmitted from the aircraft 102 to a suitable ground-based unit 118, such as a ground-based control unit, processor or database, for example. By operating the transceiver 104 in a receiver mode and the ground-based transceiver 114 in a transmitting mode, data may be transmitted from the ground-based unit 118 to the aircraft 102.

In various embodiments, the ground-based coil 116 may be several meters in diameter or having a cross-sectional area large enough to substantially encompass a cockpit area of a passenger aircraft, or an area spanned by small aircraft such as a commuter type fixed wing jet or a helicopter. The ground-based coil 116 may lie flat along the ground with its normal facing perpendicular to the ground or airplane surface. Thus, the airplane may taxi along the ground to the location of the ground-based coil 116 so that the aircraft-based coil 106 is located within or above the ground-based coil 116 in order to establish a communication link between the aircraft 102 and the ground-based unit 118. In other words, the aircraft-based coil 106 may be moved to within a volume that is defined by or is affected by a magnetic field that is generated at the ground-based coil 116. The airplane may break the communication link by taxiing away from the ground-based coil 116. When the aircraft-based coil 106 is located above the ground-based coil 116, a magnetic field generated at the ground-based coil 116 may be detected at the aircraft-based coil 106 of the aircraft 102 and a magnetic field generated at the aircraft-based coil 106 may be detected at the ground-based coil 106. An annunciator in the cockpit may indicate to the pilot that the aircraft 102 is within acceptable range of the ground-based coil 116. Also, the ground crew directing the aircraft 102 may use a visual alignment marking or a positive electrical indicator (e.g., sound or light) to confirm that the aircraft 102 is positioned appropriately for wireless communication. In various embodiments, the ground-based coil 116 may be located at a hanger location, an aircraft boarding location, an aircraft de-icing station; a resting location of the aircraft, or other suitable location on the ground. The ground-based coil 116 may be buried underneath the ground surface or laid on top of a ground surface, positioned in such a way as to be in close proximity to the aircraft 102. Other such positions may include mounting the ground-based coil 116 on a movable gateway, a ground service vehicle or a refueling vehicle.

FIG. 1 shows an illustrative example in which the aircraft 102 is a passenger aircraft such as the Boeing 747, 757, 767, 777, 787, the Airbus A380, etc. The aircraft-based coil 106 may be located below a cockpit location of the aircraft 102. The ground-based coil 116 is located at the boarding area where the cockpit may be located during a boarding operation. Therefore, the information may be communicated while passenger are de-boarding and boarding the aircraft 102.

Figure 2:
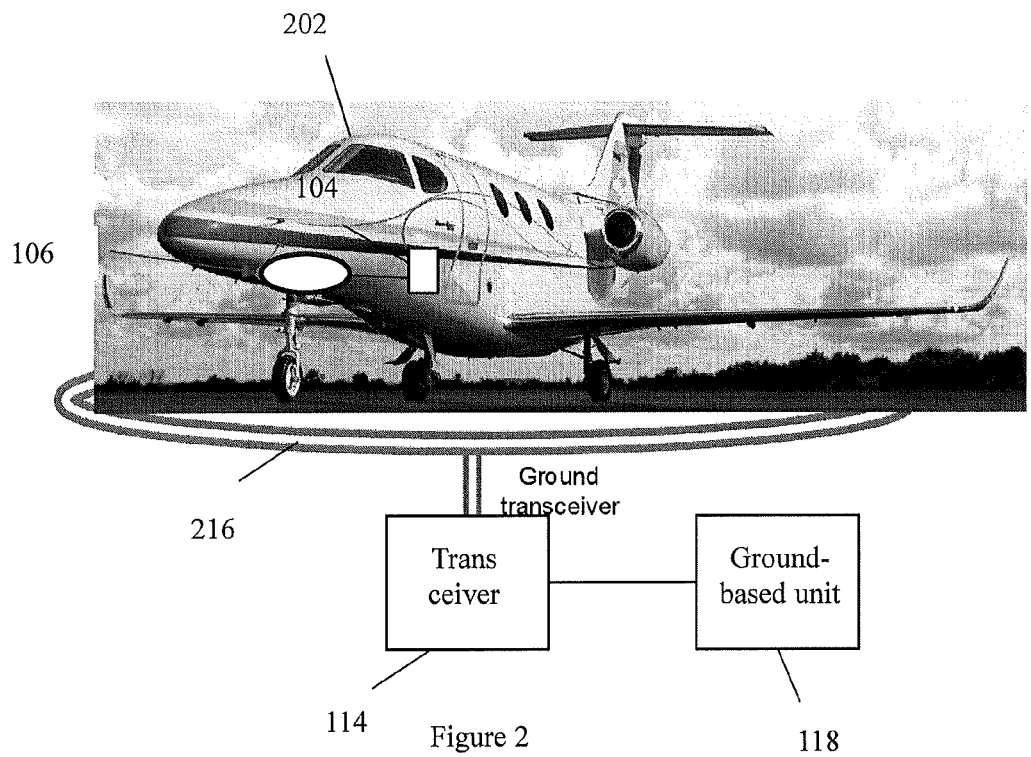
FIG. 2 shows another embodiment of the communication system for use with a commuter-type aircraft.
Figure 3:
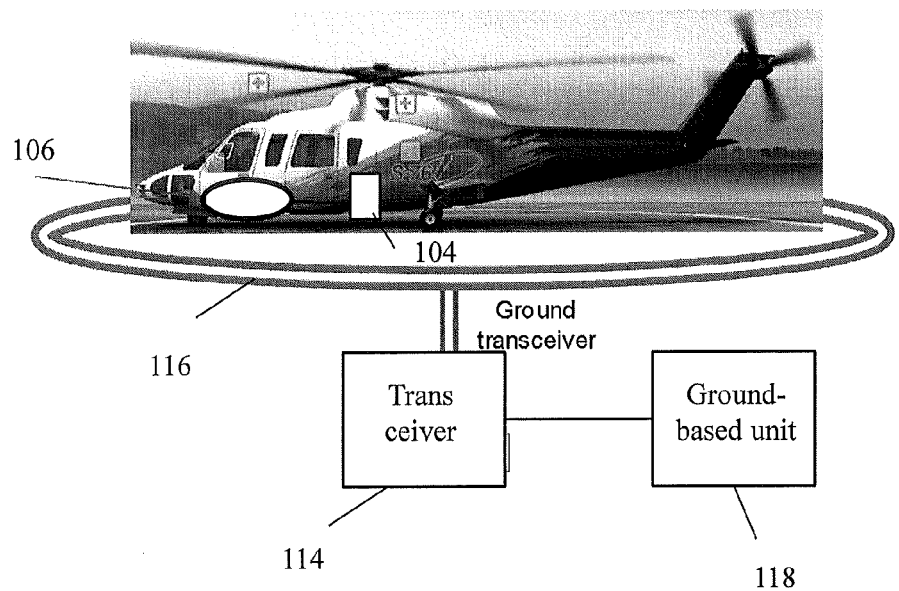
FIG. 3 shows yet another embodiment of the communication system in which the aircraft is a helicopter.

FIG. 2 shows another embodiment of the communication system for use with a commuter-type aircraft 202. The ground-based coil 216 has a diameter that is approximately the same as a length or width of the aircraft 202. FIG. 3 shows yet another embodiment of the communication system in which the aircraft is a helicopter. As in FIG. 2, the diameter of the ground-based coil is approximately the same as the length of the helicopter.

Figure 4:
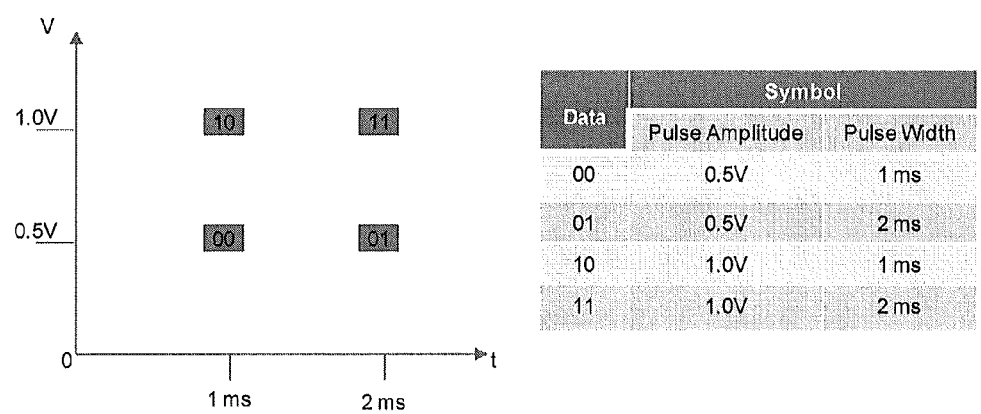
FIG. 4 illustrates a signal communication protocol that may be used with the illustrative communication systems shown in FIGS. 1-3.

FIG. 4 illustrates a signal communication protocol that may be used with the illustrative communication systems shown in FIGS. 1-3. For many aircraft, such as passenger aircraft, for example, the aircraft is on the ground for a designated amount of time before it is takes off for its next destination. In addition, the aircraft may be stationary for only a short amount of its time on the ground, such as during a boarding and de-boarding operation, for example. Thus, the communication system 100 transfers all or most of its data from the aircraft to the ground-based unit during this time. The present disclosure therefore combines pulse width modulation with amplitude modulation to achieve desired performance of multiple bits/baud. The achievable efficiency of this system, referred to herein as called Pulse Amplitude Width System or PAWS, may be increased via improved circuit techniques, etc.

FIG. 4 shows a matrix of illustrative pulse characteristics used in the PAWS protocol to achieve a selected communication efficiency. In one embodiment, the selected communication efficiency is about two bits/baud. Signal pulse duration is shown along the horizontal axis and signal magnitude is shown along the vertical axis. A signal may include a pulse characterized by both its magnitude and duration. The pulse duration may be one of two time durations (e.g., 1 millisecond and 2 milliseconds) while the pulse amplitude may be one of two values (e.g., 0.5 volts and 1.0 volts). Various combinations of these various pulse characteristics produces four different states, which may therefore be used to represent binary bit pairs. For example, bit pair '00' may be transmitted using a pulse having a magnitude of 0.5 V and having a duration of 1 millisecond. The table shown in FIG. 4 describes the pulse characteristics for each bit pair.

Figure 5:
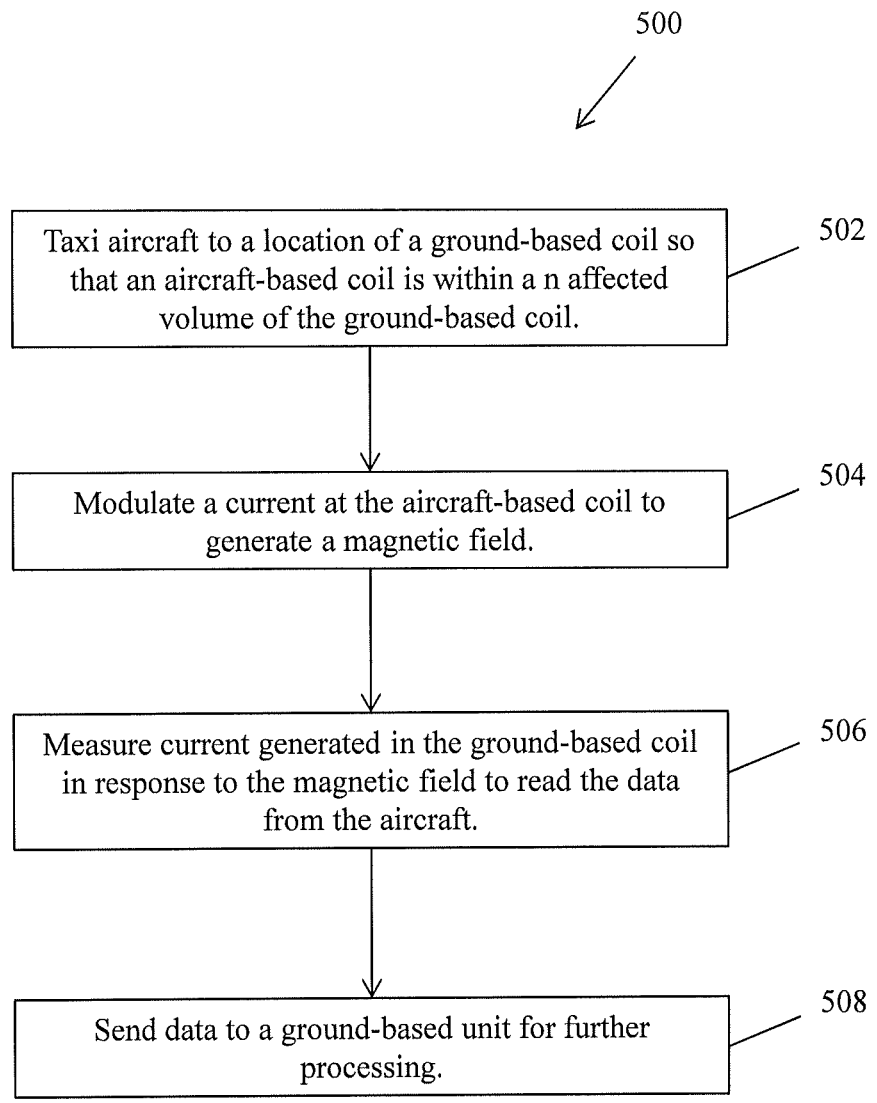
FIG. 5 shows a flowchart illustrating a communication method of the present disclosure.

FIG. 5 shows a flowchart 500 illustrating a communication method of the present disclosure. In block 502, an aircraft taxis to a location of a ground-based coil so that an aircraft-based coil is within a volume affected by a magnetic field generated at the ground-based coil. In block 504, a current may be modulated at the aircraft-based coil to generate a magnetic field. The modulation of the current is according to a communication protocol for transferring data from the aircraft to a ground-based unit, such as the protocol illustrated in FIG. 4. In block 506, the magnetic field generated at the aircraft-based coil produces a current in the ground-based coil, and the current in the ground-based coil is measured to read the data from the aircraft. In block 508, the read data is sent to a ground-based unit for further processing and review. It is to be noted that communication from the ground-based unit to the aircraft may also be performed by generating the magnetic field in the ground-based coil and reading currents in the aircraft-based coil that are in response to the generated magnetic field.

The present disclosure therefore enables wireless transfer of data stored in an aircraft to ground-based units by using magnetic field radio frequency (RF) signals. Using magnetic field radio frequency communication has several advantages over electric field RF communications. For example, the magnetic field RF communication decays at about 60 decibels/decade (dB/decade) vs. 20 dB/decade for electric field RF communications. Thus, the magnetic field RF communication is more resistant to jamming techniques than electric field RF communication. Also, the magnetic field RF communication is more secure and allows less eavesdropping. For example, since the magnetic field decays at a faster rate, signals may be generally below a threshold of detection at distances beyond 3 meters away from the ground-based coil, using present technologies. Additionally, the magnetic field RF signals do not share the same frequency bands as present electric field RF signals. Thus, commercial communication may be performed substantially simultaneously with the magnetic field communication, with reduced interference with the bandwidth of tablet computers, laptops, smartphones, etc. Furthermore, due to the decay rate of magnetic field RF signals, data communication to and from a single aircraft may not interfere with data communication from neighboring aircraft. Therefore, a communication system may be established for a plurality of densely-parked aircraft using a plurality of densely packed ground-based coils, where each coil is at an assigned parking area for commuter aircraft or at boarding areas of passenger aircraft at large hub airports.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

While the exemplary embodiment to the disclosure has been described, it will be understood that those skilled in the art, both now and in the future, may make various improvements and enhancements which fall within the scope of the claims which follow. These claims should be construed to maintain the proper protection for the disclosure first described.

What is claimed is:

1. A method of communicating a signal, comprising:
   determining that aircraft-based coil is within a selected volume defined by a ground-based coil fixed in the ground, wherein the ground-based coil fixedly located underneath a ground surface;
   modulating a current in one of the aircraft-based coil and the ground-based coil to generate a magnetic field in the volume; and
   communicating the signal by measuring a current generated in the other of the aircraft-based coil and the ground-based coil in response to the generated magnetic field.

2. The method of claim 1, wherein the ground-based coil is a horizontally-placed coil having a normal substantially perpendicular to a landing surface of the aircraft.

3. The method of claim 1, further comprising using a Pulse Amplitude Width Modulation System to modulate the current to generate the magnetic field in the volume.

4. The method of claim 1, further comprising obtaining multiple bits/baud transfer rate using the Pulse Amplitude Width Modulation System.

5. The method of claim 1, wherein the signal further comprises data obtained at sensors of the aircraft during a flight of the aircraft.

6. The method of claim 1, further comprising communicating the signal substantially simultaneously with an electric field communication occurring at the aircraft.

7. The method of claim 1, wherein the selected volume is a volume that is affected by the magnetic field create via modulation of the current in the ground-based coil.

8. A communication system, comprising:
   a ground-based coil fixedly located underneath a ground surface;
   a ground-based transceiver configured to generate and measure a magnetic field at the ground-based coil to communicate a signal;
   an aircraft-based coil conveyed on an aircraft; and
   a transceiver conveyed on the aircraft configured to generate and measure a magnetic field at the aircraft-based coil to communicate the signal.

9. The system of claim 8, wherein the ground-based coil is a horizontally-placed coil having a normal substantially perpendicular to a landing surface of the aircraft.

10. The system of claim 8, wherein at least one of the ground-based transceiver and the transceiver conveyed on the aircraft is configured to use a Pulse Amplitude Width Modulation System to generate the magnetic field in the volume.

11. The system of claim 8, wherein a communication rate of multiple bits/baud transfer rate is achieved using the Pulse Amplitude Width Modulation System.

12. The system of claim 8, wherein the signal communication occurs substantially simultaneously with an electric field communication occurring at the aircraft.

13. The system of claim 8, further comprising the aircraft.

14. The system of claim 13, wherein the aircraft is moved to a volume affected by a magnetic field of the ground-based coil to establish a communication link between the transceiver conveyed by the aircraft and the ground-based transceiver.

* * * * *